United States Patent
Cree

(10) Patent No.: US 10,259,930 B2
(45) Date of Patent: *Apr. 16, 2019

(54) PROCESS FOR REDUCING PEROXIDE MIGRATION IN CROSSLINKABLE ETHYLENE-BASED POLYMER COMPOSITIONS

(71) Applicant: Dow Global Technologies LLC, Midland, MI (US)

(72) Inventor: Stephen H. Cree, Hirzel (CH)

(73) Assignee: Dow Global Technologies LLC, Midland, MI (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/586,765

(22) Filed: May 4, 2017

(65) Prior Publication Data

US 2017/0233546 A1 Aug. 17, 2017

Related U.S. Application Data

(63) Continuation of application No. 14/428,708, filed as application No. PCT/US2013/058189 on Sep. 5, 2013, now Pat. No. 9,758,638.

(60) Provisional application No. 61/706,398, filed on Sep. 27, 2012.

(51) Int. Cl.
| | | |
|---|---|---|
| C08K 5/01 | (2006.01) | |
| H01B 3/44 | (2006.01) | |
| C08K 5/14 | (2006.01) | |
| B29B 7/00 | (2006.01) | |
| B29B 7/72 | (2006.01) | |
| B29B 7/90 | (2006.01) | |
| B29B 7/38 | (2006.01) | |

(52) U.S. Cl.
CPC ............ *C08K 5/14* (2013.01); *B29B 7/007* (2013.01); *B29B 7/726* (2013.01); *B29B 7/90* (2013.01); *C08K 5/01* (2013.01); *H01B 3/441* (2013.01); *B29B 7/38* (2013.01); *C08K 2201/014* (2013.01)

(58) Field of Classification Search
CPC ...... C08K 5/14; C08K 5/01; C08K 2201/014; H01B 3/441; C08L 23/04
USPC ........................................................ 524/585
See application file for complete search history.

(56) References Cited

U.S. PATENT DOCUMENTS

| | | |
|---|---|---|
| 4,018,852 A | 4/1977 | Schober |
| 4,305,849 A | 12/1981 | Kawasaki et al. |
| 4,857,600 A | 8/1989 | Gross et al. |
| 5,246,783 A | 9/1993 | Spenadel et al. |
| 5,272,236 A | 12/1993 | Lai et al. |
| 5,278,272 A | 1/1994 | Lai et al. |
| 5,298,564 A | 3/1994 | Suyama et al. |
| 5,346,961 A | 9/1994 | Shaw et al. |
| 5,539,075 A | 7/1996 | Gustafsson et al. |
| 5,575,965 A | 11/1996 | Caronia et al. |
| 5,986,028 A | 11/1999 | Lai et al. |
| 6,231,978 B1 * | 5/2001 | Keogh .................. C08K 5/01 174/110 PM |
| 6,496,629 B2 | 12/2002 | Ma et al. |
| 6,521,695 B1 | 2/2003 | Peruzotti et al. |
| 6,714,707 B2 | 3/2004 | Rossi et al. |
| 6,869,995 B2 | 3/2005 | Caronia |
| 6,908,673 B2 | 6/2005 | Castellani et al. |
| 7,355,089 B2 | 4/2008 | Chang et al. |
| 7,452,933 B2 | 11/2008 | Song et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 7,579,408 B2 | 8/2009 | Walton et al. |
| 7,582,716 B2 | 9/2009 | Liang et al. |
| 7,999,188 B2 * | 8/2011 | Perego ................. H01B 3/441 174/120 R |
| 9,758,638 B2 * | 9/2017 | Cree ..................... H01B 3/441 |
| 2009/0029166 A1 | 1/2009 | Bostrom et al. |
| 2009/0247678 A1 | 10/2009 | Lee et al. |
| 2010/0126756 A1 * | 5/2010 | Perego ................. C08K 5/01 174/250 |
| 2013/0233376 A1 | 9/2013 | Ikenaga et al. |

FOREIGN PATENT DOCUMENTS

| | | |
|---|---|---|
| CN | 1801401 A | 7/2006 |
| EP | 0966003 A1 | 12/1999 |
| EP | 1146083 A1 | 10/2001 |
| EP | 0992041 B1 | 8/2005 |
| EP | 1731565 A1 | 12/2006 |
| EP | 1944327 A1 | 7/2008 |
| GB | 1448489 | 9/1976 |
| JP | H11-288624 A | 10/1999 |
| WO | 85/05216 A1 | 11/1985 |
| WO | 2005/015576 A1 | 2/2005 |
| WO | 2005/066280 A2 | 7/2005 |
| WO | 2008/058572 A1 | 9/2008 |
| WO | 2009/097565 A1 | 8/2009 |
| WO | 2011/092533 A1 | 8/2011 |

* cited by examiner

*Primary Examiner* — Josephine L Chang
(74) *Attorney, Agent, or Firm* — Husch Blackwell LLP

(57) ABSTRACT

A composition comprising:
A. 91.5 to 97.9% of a crosslinkable ethylene-based polymer, e.g., LDPE;
B. 1 to 3% of an organic peroxide, e.g., dicumyl peroxide;
C. 1 to 5% of a dielectric fluid, e.g., an alkylated naphthalene; and
D. 0.1 to 0.5% of a coagent such as AMSD.

The compositions exhibit high cure rates without any significant reduction in scorch resistance, heat ageing and electrical performance, and are particularly useful as insulation sheaths for medium and high voltage power cables.

14 Claims, No Drawings

PROCESS FOR REDUCING PEROXIDE MIGRATION IN CROSSLINKABLE ETHYLENE-BASED POLYMER COMPOSITIONS

FIELD OF THE INVENTION

This invention relates to crosslinkable, ethylene-based polymer compositions. In one aspect, the invention relates to crosslinkable, ethylene-based compositions comprising a peroxide initiator while in another aspect, the invention relates to such compositions used for making medium and high voltage cable insulation.

BACKGROUND OF THE INVENTION

Current state of the art insulation compounds for medium and high voltage cables are based upon low density polyethylene (LDPE) containing about 2 weight percent (wt %) of peroxide. This basic formulation is generally enhanced for commercial use by the addition of a range of additives which includes the following: anti-oxidants, heat stabilizers, scorch retarders, cure boosters, voltage stabilizers and in the case of medium voltage cables, an additive to inhibit water treeing. The final commercial formulation is often a compromise between scorch, cure, heat ageing performance and electrical behavior.

The majority of crosslinkable polyethylene (XLPE) insulation compounds use high pressure/low density polyethylene (HPLDPE) and dicumyl peroxide (DCP) as a basis for the formulation. LDPE has good melt strength and shear thinning behavior which is required for cable processing, and it does not contain any metallic catalyst residues which can impact electrical performance of the cable. In general a tubular LDPE of approximately 2 melt index is the standard resin of choice for medium voltage power cable insulation.

The peroxide of choice is typically DCP which is a relatively low cost, low activation energy peroxide which can be effectively soaked or compounded into polyethylene to yield a fully curable system. DCP-based systems enable melt extrusion of the LDPE compound without extensive premature peroxide decomposition. In general peroxide levels of about 2 wt % are employed but the exact level depends upon the actual structure of the LDPE, particularly the level of vinyl unsaturation, and the presence of other additives such as stabilizers in the blend.

XLPE compounds also contain antioxidants, the most common of which are the thiophenolic stabilizers. These stabilizers give processing stability, long term ageing protection of the cable, and minimal interference with the peroxide crosslinking reaction.

To improve the scorch-cure balance of the XLPE composition, additives such as α-methyl styrene dimer can be added. This additive improves both the scorch performance of the XLPE composition and acts as a cure booster or co-agent to improve the final cure state of the crosslinked insulation.

In the case of medium voltage insulation formulations, often a water tree retardant additive is required, e.g., low levels (less than 1 wt %) polyethylene glycol to ensure water tree retardancy of the crosslinked ethylene-based polymer. In the case of high voltage compositions, voltage stabilisers such as aromatic amines can be added which impact the initiation and growth of electrical trees. Such defects are the cause of failure or breakdown of crosslinked ethylene-based polymer insulation in an actual service environment.

However in spite of the continued improvement of XLPE formulations for cable insulation, current compounds suffer from a range of limitations due to additive solubility limitations and the antagonistic interaction of the additives themselves.

The ethylene-based polymer, e.g., LDPE, used to make the cable insulation is typically made, stored and transported to the site at which it is converted into cable insulation in the form of pellets. These pellets often comprise one or more additives which are either mixed with the ethylene-based polymer before it is pelletized or subsequently added to the pellet, e.g., coated onto or imbibed into the pellet.

The biggest issue with XLPE compositions is the migration of the peroxide to the outside or surface of the polymer pellets during compound storage and/or transport. For example, the maximum solubility of DCP in LDPE is estimated at around 1 wt % at room temperature, well below the actual levels used commercially (about 2 wt %). Therefore commercial XLPE compositions suffer from significant peroxide migration issues, an effect which increases with time. Temperature also has a major impact, and the migration of DCP is thought to have a maximum at around 5° C. Temperature cycling such as that found during day/night cycles is also thought to increase the tendency of peroxide migration.

XLPE pellets which have migrated peroxide on the surface lead to a number of problems during cable production. This is due to the lower melting peroxide coating which can impact the pellet feeding process. The page and irregular feeding of the XLPE composition with migrated peroxide can lead to variation in cable core diameter and increased scrap cable generation. This is a significant problem for XLPE composition producers and cable manufacturers.

The migration of peroxide can be greatly reduced in the case of medium voltage tree retardant compositions which comprise significant levels of acrylate copolymer blended into the LDPE (WO 85/05216, U.S. Pat. No. 5,539,075 and US 2009/0029166). However the use of acrylate copolymers increases significantly the dissipation factor (tan delta) of the polymer composition rendering the copolymer approach ineffective for higher voltage insulations where dissipation factor should be kept as low as possible.

Therefore a need exists for an XLPE composition which is able to maintain scorch-cure performance, heat ageing performance and electrical performance while also reducing significantly the tendency for peroxide migration.

SUMMARY OF THE INVENTION

In one embodiment the invention is a composition comprising a crosslinkable ethylene-based polymer, a peroxide initiator and a dielectric fluid.

In one embodiment the invention is a composition comprising, in weight percent based upon the weight of the composition:
A. 91.5 to 97.9% of an ethylene-based polymer;
B. 1.0 to 3% of an organic peroxide; and
C. 1.0 to 5% of a dielectric fluid.
D. 0.1 to 0.5% of a coagent.

In one embodiment the invention is a medium or high voltage cable insulation made from a composition comprising a crosslinkable ethylene-based polymer, a peroxide initiator and a dielectric fluid.

DETAILED DESCRIPTION OF THE PREFERRED EMBODIMENT

Overview

The addition of a low level of dielectric fluid to a crosslinkable ethylene-based polymer will solubilize an organic peroxide initiator such that the problem of peroxide migration is greatly reduced or eliminated while at the same time maintaining an excellent balance of scorch and cure performance.

Additional Embodiments

In one embodiment the invention is a composition consisting essentially of, in weight percent based upon the weight of the composition:
A. 91.5 to 97.9% of an ethylene-based polymer;
B. 1.0 to 3% of an organic peroxide; and
C. 1 to 5% of a dielectric fluid.
D. 0.1 to 0.5% of a coagent.

In one embodiment the invention is a composition consisting essentially of, in weight percent based upon the weight of the composition:
A. 91.5% to 97.9% of an ethylene-based polymer;
B. 1.0 to 3% of an organic peroxide;
C. 1 to 5% of a dielectric fluid;
D. 0.1 to 0.5% of a coagent.
E. 0.01 to 1% of at least one additive selected from the group consisting of anti-oxidants, water-tree inhibitors, processing aids, coupling agents, ultraviolet light absorbers or stabilizers, scorch inhibitors, nucleating agents, plasticizers, lubricants, viscosity control agents, extender oils, acid scavengers and metal deactivators.

In one embodiment the invention is a composition comprising a crosslinkable ethylene-based polymer, a peroxide initiator, a dielectric fluid, a coagent and at least one of an anti-oxidant, heat stabilizer, scorch retarder, voltage stabilizer and a water tree inhibitor.

In one embodiment the invention is a composition consisting essentially of a crosslinkable ethylene-based polymer, a peroxide initiator, a dielectric fluid, a coagent and at least one of an anti-oxidant, heat stabilizer, scorch retarder, voltage stabilizer and a water-tree inhibitor.

In one embodiment the crosslinkable ethylene-based polymer of the composition is a polyethylene.

In one embodiment the crosslinkable ethylene-based polymer of the composition is LDPE.

In one embodiment the peroxide initiator of the composition is DCP.

In one embodiment the dielectric fluid of the composition is a non-polar hydrocarbon.

In one embodiment the dielectric fluid of the composition is an alkylated naphthalene.

In one embodiment the coagent is alpha methyl styrene dimer (AMSD)

In one embodiment the invention is a cable insulation made from a composition comprising a crosslinkable ethylene-based polymer, a peroxide initiator and a dielectric fluid.

In one embodiment the invention is a cable insulation made from a composition comprising a crosslinkable ethylene-based polymer, a peroxide initiator, a dielectric fluid and a coagent.

In one embodiment the cable component is an insulation layer for a medium or high voltage cable.

In one embodiment the invention is a medium or high voltage power cable comprising an insulation layer made from a composition comprising, in weight percent based upon the weight of the composition:
A. 91.5% to 97.9% of an ethylene-based polymer;
B. 1.0 to 3% of an organic peroxide; and
C. 1 to 5% of a dielectric fluid.
D. 0.1 to 0.5% of a coagent.

In one embodiment the invention is a process for making a medium or high voltage power cable, the process comprising extruding an insulation layer directly or indirectly over an electrical conductor, the insulation layer made from a crosslinkable composition comprising a crosslinkable ethylene-based polymer, a peroxide initiator, a dielectric fluid and a coagent.

Definitions

Unless stated to the contrary, implicit from the context, or customary in the art, all parts and percents are based on weight. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 0.9, 1.1, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of various components in the inventive composition, and the various characteristics and properties by which these compositions and the wire and cable insulation made from these compositions are defined.

"Wire" and like terms mean a single strand of conductive metal, e.g., copper or aluminum, or a single strand of optical fiber.

"Cable", "power cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. Electrical insulation applications are generally divided into low voltage insulation which are those less than 1 kV (one thousand volts), medium voltage insulation which ranges from 1 kV k to 30 kV, high voltage insulation which ranges from 30 kV to 150 kV, and extra high voltage insulation which is for applications above 150 kV (as defined by the IEC, the International Electrotechnical Commission). Typical cable designs are illustrated in U.S. Pat. Nos. 5,246,783, 6,496,629 and 6,714,707.

"Composition" and like terms mean a mixture or blend of two or more components.

"Polymer" and like terms means a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Ethylene-based polymer" and like terms means a polymer containing, in polymerized form, a majority weight percent of units derived from ethylene based on the total weight of the polymer. Nonlimiting examples of ethylene-based polymers include low density polyethylene (LDPE), linear low density polyethylene (LLDPE), very low density polyethylene (VLDPE), ultra-low density polyethylene (ULDPE), medium density polyethylene (MDPE), and high density polyethylene (HDPE). For purposes of this disclosure, "ethylene-based polymer" does not include functionalized polyethylene, e.g., ethylene vinyl acetate (EVA), ethylene ethyl acrylate (EEA), and the like.

"Crosslinked", "cured" and like terms mean that the polymer, before or after it is shaped into an article, was subjected or exposed to a treatment which induced crosslinking and has xylene or decalene extractables of less than or equal to 40 weight percent (i.e., greater than or equal to 60 weight percent gel content).

"Crosslinkable", "curable" and like terms means that the polymer, before or after shaped into an article, is not cured or crosslinked and has not been subjected or exposed to treatment that has induced substantial crosslinking although the polymer comprises additive(s) or functionality which will cause or promote substantial crosslinking upon subjection or exposure to such treatment (e.g., exposure to an activated peroxide).

Ethylene-Based Polymer

The ethylenic polymers used in the practice of this invention are non-functionalized polymers, i.e., they do not contain functional groups, such as hydroxyl, amine, amide, etc. As such polymers like ethylene vinyl acetate, ethylene methyl or ethyl acrylate and the like are not ethylene-based polymers within the context of this invention.

The ethylene-based polymers of this invention include homopolymers and interpolymers, and random and blocky interpolymers. The ethylenic interpolymers include elastomers, flexomers and plastomers. The ethylene-based polymer comprises at least 50, preferably at least 60 and more preferably at least 80, wt % of units derived from ethylene. The other units of the ethylenic interpolymer are typically derived from one or more α-olefins.

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Illustrative ethylenic interpolymers include copolymers of ethylene/propylene, ethylene/butene, ethylene/1-hexene, ethylene/1-octene, and the like. Illustrative ethylenic terpolymers include ethylene/propylene/1-octene, ethylene/propylene-/butene, ethylene/butene/1-octene, ethylene/propylene/diene monomer (EPDM) and ethylene/butene/styrene.

Examples of ethylenic polymers useful in the practice of this invention include high density polyethylene (HDPE); medium density polyethylene (MDPE); low density polyethylene (LDPE); very low density polyethylene (VLDPE); homogeneously branched, linear ethylene/α-olefin copolymers (e.g. TAFMER® by Mitsui Petrochemicals Company Limited and EXACT® by DEX-Plastomers); homogeneously branched, substantially linear ethylene/α-olefin polymers (e.g., AFFINITY® polyolefin plastomers and ENGAGE® polyolefin elastomers available from The Dow Chemical Company); and ethylene block copolymers (INFUSE® also available from The Dow Chemical Company). The substantially linear ethylene copolymers are more fully described in U.S. Pat. Nos. 5,272,236, 5,278,272 and 5,986,028, and the ethylene block copolymers are more fully described in U.S. Pat. Nos. 7,579,408, 7,355,089 7,524,911, 7,514,517, 7,582,716 and 7,504,347.

Ethylenic interpolymers of particular interest for use in the practice of this invention are LDPE, linear low density polyethylene (LLDPE) and HDPE. LDPE is particularly preferred. These ethylenic copolymers are commercially available from a number of different sources including The Dow Chemical Company under such trademarks as DOWLEX, ATTANE and FLEXOMER.

One preferred polymer is a high pressure low density polyethylene (HPLDPE). One conventional high pressure process is described in *Introduction to Polymer Chemistry*, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of 10,000 to 30,000 psi (70 to 210 kPa) and the temperature is in the range of 175 to 250° C., and in the tubular reactor, the pressure is in the range of 25,000 to 45,000 psi (170 to 310 kPa) and the temperature is in the range of 200 to 350° C.

The amount of ethylene polymer present in the compositions of this invention can vary widely, but the amount is typically of 50 to 97.9, more typically 60 to 97.9 and even more typically 80 to 97.9, wt % based on the total weight of the composition. The ethylene polymer can be present as a single polymer, e.g., LDPE, or as a blend of two or more polymers, e.g., LDPE and MDPE.

In one embodiment the LDPE product used here is a tubular high pressure LDPE with a nominal 2 melt index ($I_2$ at 190° C.) and 0.920 g/cm³ density. It has a peak melting point of about 109° C. and a crystallinity of about 42%. Molecular weight and molecular weight distribution are also important for cure performance and processing. GPC DRI shows the product to have a number and weight average molecular weight of 14,000 and 95,000 respectively and therefore a polydispersity Mw/Mn of 6.8. The LDPE used here has between 0.01 and 0.5 vinyl groups per 1,000 carbon atoms.

Organic Peroxide

An organic peroxide is used in the practice of this invention. Organic peroxides are organic compounds containing the peroxide function group (ROOR'). If R' is hydrogen, the compound is called an organic hydroperoxide. Peresters have the general structure RC(O)OOR. The O—O bond easily breaks and forms free radicals of the form RO•. Thus, organic peroxides are useful as initiators for various types of reactions including the crosslinking of ethylene-based polymers.

Examples of the organic peroxide initiator that can be used in the practice of this invention include dicumyl peroxide; bis(alpha-t-butyl-peroxyisopropyl)benzene; isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy)3,3,5-trimethylcyclohexane; isopropylcumyl cumylperoxide; di(isopropylcumyl) peroxide; t-butyl peroxy benzoate, 4,4-bis(t-butyl peroxy) butyl valerate and mixtures of two or more such initiators]. In the practice of this invention, the organic peroxide can be present in amounts from greater than 1 to 3 or more weight percent, typically from 1.5 to 3 wt % and more typically from 1.5 to 2.5 wt % based upon the weight of the composition.

Coagent

Various curing co-agents (e.g., cure boosters or cure boosters with scorch retarding properties) can also be used in combination with the peroxide initiator, and these include triallyl isocyanurate; triallyl cyanurate; ethoxylated bisphenol A dimethacrylate; α-methyl styrene dimer (AMSD); and other co-agents as described in U.S. Pat. Nos. 5,346,961 and 4,018,852. Co-agents are used typically in amounts of greater than 0 (e.g., 0.01) to 1.0, more typically 0.1 to 1.0 and even more typically 0.1 to 0.5 wt % based on the weight of the composition.

Dielectric Fluid

A dielectric fluid is a fluid that does not conduct electric current, or least any significant electric current, under the conditions at which it is used. Examples of dielectric fluids include mineral oil, n-hexane, n-heptane, benzene, castor oil, polychlorinated biphenyls, silicone oil, and the like. The dielectric fluids used in the practice of this invention are fully or near fully miscible in the ethylene-based polymer, particularly LDPE, and as such, are typically hydrocarbon in nature.

In one embodiment, the dielectric fluid comprises a compound of formula (I)

X-A-X' (I)

wherein A is a monocyclic aromatic moiety or an at least partially aromatic condensed polycyclic moiety; and at least one of X and X' is methyl or an aliphatic moiety the compound having a ratio of number of aromatic carbon atoms to total number of carbon atoms greater than or equal to 0.6.

One dielectric fluid of particular interest, particularly in combination with an LDPE and DCP, is SYNESSTIC, an alkylated naphthalene available from Exxon Mobil Corporation. This dielectric fluid is available in various grades most, if not all, of which can be used in the practice of this invention. In the practice of this invention, the dielectric fluid is present in amounts from 0.5 to 10 or more weight percent, typically from 1 to 7 wt % and more typically from 1 to 5 wt % based upon the weight of the composition.

Fillers and Additives

The composition may contain additives including but not limited to antioxidants (e.g., hindered phenols such as, for example, IRGANOX™ 1010 available from BASF,) and phosphites (e.g., IRGAFOS™ 168 available from BASF,), thio phenolic stabilizers such as IRGASTAB™ KV 10 from BASF, 2,2-thiobis(6-t-butyl-4-methylphenol) known as LOWINOX™ TBP-6 and 4,4-thiobis(2-t-butyl-5-methylphenol) known as LOWINOX™ TBM-6 available from Great Lakes Chemical, water-tree inhibitors such as polysiloxanes with hydrolysable alkoxy groups or polyethylene glycols or polyethylene oxide varying in molecular weight in the range from 1,000 to 1000,000, processing aids, coupling agents, ultraviolet absorbers or stabilizers, scorch inhibitors such as hydroxyl-tempo or alpha methyl styrene dimer, antistatic agents, nucleating agents, plasticizers, lubricants, viscosity control agents, surfactants, extender oils, acid scavengers, metal deactivators, and the like. Additives are typically used in amounts ranging from 0.01 to 1 wt % based on the weight of the composition. Fillers are generally added in larger amounts although the amount can range from as low as 0.01 or less to 50 or more wt % based on the weight of the composition. Examples of fillers include but are not limited to various flame retardants, clays, precipitated silica and silicates, fumed silica, calcium carbonate, ground minerals, and carbon blacks with typical arithmetic mean particle sizes larger than 15 nanometers.

Compounding and Fabrication

Compounding of a cable insulation material can be effected by standard equipment known to those skilled in the art. Examples of compounding equipment are internal batch mixers, such as a BANBURY or BOLLING internal mixer. Alternatively, continuous single, or twin screw, mixers can be used, such as FARREL continuous mixer, a Werner and Pfleiderer twin screw mixer, or a Buss™ kneading continuous extruder.

A cable containing an insulation layer comprising a composition of the invention can be prepared with various types of extruders, e.g., single or twin screw types. A description of a conventional extruder can be found in U.S. Pat. No. 4,857,600. An example of co-extrusion and an extruder therefore can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating where the polymeric insulation is crosslinked after extrusion, the cable often passes immediately into a heated vulcanization zone downstream of the extrusion die. The heated cure zone can be maintained at a temperature in the range of about 200 to about 500° C., preferably in the range of about 170 to about 350° C. The heated zone can be heated by pressurized steam, or inductively heated pressurized nitrogen gas.

The invention is illustrated by the following examples.

Specific Embodiments

Materials

The following materials are used in the following examples. The materials are dried or otherwise treated, if at all, as described.

DFDK 7423NT is LDPE with a density of 0.920 g/cc (measured by ASTM D-792) and a nominal I₂ of 2.0 g/10 min (measured by ASTM D-1238, condition 190 C/2.16 kg) available from The Dow Chemical Company.

Dicumyl peroxide (DCP) is available Arkema as LUPEROX™ DC.

TBM-6 anti-oxidant is 4,4-Thiobis(2-t-butyl-5-methylphenol) known as LOWINOX™ TBM-6 is available from Great Lakes Chemical.

Alpha-methyl styrene dimer (AMSD) is a scorch inhibitor available from Nippon Oil and Fats Company.

SYNESSTIC 5 is an alkylated naphthalene with a kinematic viscosity 100 C (cSt) measured by ASTM D-445 of 5 and available from ExxonMobil Chemical.

SYNESSTIC 12 is an alkylated naphthalene with a kinematic viscosity 100 C (cSt) measured by ASTM D-445 of 12 and available from ExxonMobil Chemical.

Procedures and Test Methods

Compounding Procedure

The formulations listed in Table 1 were compounded on a Collin W150M two-roll mill. The front roll temperature was set at 130° C. and the back roll at 125° C. The roll mill gap was set at 1 mm and the roll speed at 20 rpm. Upon melting the base LDPE separately, the dicumyl peroxide (DCP) is dissolved in dielectric fluid SYNESSTIC 5. Antioxidant TPM-6 was added to the molten LDPE by sprinkling onto the hot melt. If required, AMSD was then added drop wise and the molten band thoroughly homogenized by repeated reduction and expansion of the molten polymer. Finally the peroxide solution was added and the homogenization procedure repeated. Mixing generally takes between 10-15 minutes. The final polymer sheet was then taken for either compression molding, evaluation in the MDR, or pelletization for peroxide migration testing.

Compression Molding of Plates

From the roll mill sheet, 2 mm plates were pressed and cured under pressure on the Burkle press LA 63. Conditions employed were 180° C. for 10 minutes under a pressure of 120 Bar (12,000 kPa). Plates were then fast cooled to room temperature.

Moving Die Rheometer (MDR)

The simplest method for estimating the cure performance of a compound is to follow the cure reaction with a moving die rheometer. As the compound cures, the torque increases and eventually reaches a maximum when all the peroxide has decomposed. Cure state is a function of the number of crosslinks and this can be estimated by the delta torque in an MDR cure (the difference between the torque maximum and minimum). In general, the greater the delta torque the higher is the state of cure. Scorch and cure performance of the XLPE formulations were evaluated on an Alpha Technologies Rheometer MDR 2000E according to ISO 6502 as follows. Around 5-6 g of material from the roll mill was transferred to the MDR and torque measured as a function of time at two temperatures: 140° C. and 180° C.

Hot Set Test

This test is reported in detail in IEC publication 540 clause 14 and in British Standard 6469 Section 3.3. It forms part of the general test requirements for the mechanical performance of all insulating materials. The hot set test itself may be summarized as follows: A dog-bone sample of specified dimensions (ASTM 638-34; thickness <2 mm; marker lines 20 mm apart) is placed in an oven at 200° C. and a weight equal to a force of 20N/cm$^2$ attached. The elongation of the test sample (distance between marker lines) under these conditions is then measured. Samples with a low level of crosslinking elongate to a high degree (>500%), and in some cases fail by breaking within a few minutes. A hot set test pass however, requires that the sample survive at 200° C. for 15 minutes and exhibit an elongation of <175% (preferably <100% elongation). In addition, the residual elongation upon removal of the weight should be <15%.

Mechanical Properties

Tensile properties of the cured samples (dog bones of 75 mm×2 mm thick) were measured according to the IEC norm 60811-1-1 which requires a test speed of 25 mm/min.

Table 1 reports the formulations of the examples.

Note peroxide migration was determined simply by storing the materials in a refrigerator at 5 C and observing if white powder/peroxide was visible on the surface (generally this is the case at around 800 ppm methanol wash extractables. To better quantify this observation it is suggested to produce enough material in pellet form to subject them to temperature cycling experiments which is known to exacerbate the peroxide migration problem. However this will require greater quantities of pelletized material.

Table 1 does show that good scorch-cure performance is maintained with the compositions comprising the dielectric fluids and AMSD coagent.

TABLE 1

SYNESSTIC/XLPE Formulations

| Sample Description | zero AMSD; Zero Synesstic | AMSD; Zero Synesstic | zero AMSD; 2% Synesstic 5 | AMSD; 1% Synesstic 5 | AMSD; 1% Synesstic12 | AMSD: 2% Synesstic 5 | AMSD; 2% Synesstic12 |
|---|---|---|---|---|---|---|---|
| Sample No. | C-1 | C-2 | C-3 | 1 | 2 | 3 | 4 |
| Ingredients | wt % | wt % | wt % | wt % | wt % | wt % | wt % |
| DFDK 7423NT | 97.7 | 97.35 | 95.70 | 96.35 | 96.35 | 95.35 | 95.35 |
| Dicumyl peroxide | 2.00 | 2.00 | 2.00 | 2.00 | 2.00 | 2.00 | 2.00 |
| Anti-Oxidant TBM-6 | 0.30 | 0.30 | 0.30 | 0.30 | 0.30 | 0.30 | 0.30 |
| AMSD | 0.00 | 0.35 | 0.00 | 0.35 | 0.35 | 0.35 | 0.35 |
| Synesstic 5 | 0.00 | 0.00 | 2.00 | 1.00 | 0.00 | 2.00 | 0.00 |
| Synesstic 20 | 0.00 | 0.00 | 0.00 | 0.00 | 1.00 | 0.00 | 2.00 |
| sum | 100.00 | 100.00 | 100.00 | 100.00 | 100.00 | 100.00 | 100.00 |
| Peroxide Migration (5 C. storage) | yes | yes | No | No | No | No | No |
| Methanol wash test following 50 days temperature cycling (ppm) | 1080 | 950 | 250 | not measured | 220 | not measured | 170 |
| MDR | | | | | | | |
| 140 C. ts1 | 53 | 69 | 62 | 69.2 | 74.4 | 78 | 78 |
| 140 C. Delta torque | 2.4 | 2.1 | 2 | 2 | 1.9 | 1.7 | 1.7 |

TABLE 1-continued

SYNESSTIC/XLPE Formulations

| Sample Description | zero AMSD; Zero Synesstic | AMSD; Zero Synesstic | zero AMSD; 2% Synesstic 5 | AMSD; 1% Synesstic 5 | AMSD; 1% Synesstic12 | AMSD: 2% Synesstic 5 | AMSD; 2% Synesstic12 |
|---|---|---|---|---|---|---|---|
| 180 C. ts1 | 1.8 | 1.8 | 1.9 | 1.9 | 1.7 | 1.9 | 2 |
| 180 C. Delta torque | 3.2 | 3.6 | 2.6 | 3.3 | 3.3 | 3.2 | 2.8 |
| Mechanicals | | | | | | | |
| TS/EB | 19.5/540 | 18.4/505 | 19.2/610 | 18.1/520 | 19.2/530 | 19.1/545 | 18.6/585 |
| Hot Set | 85 | 73 | 155 | 78 | 70 | 100 | 110 |

The reference starting point XLPE sample C-1 has scorch performance as defined by 140 C Tsl of 53 minutes, cure as defined by hot set of 85% and a peroxide migration level of 1080 ppm as defined by the methanol wash test. At controlled room temperature, 100 ml of methanol is used to wash insolubles (PE fine particles) and residual or migrated additive molecules from the surface of 100 g of PE resin pellets. Washing takes place in a 400 ml glass beaker with stirrer at 300 rpm and 70 seconds. The methanol dissolves the additives from the surface of the pellets. Separation of the methanol wash and the pellets/insolubles is achieved by fine filtering using a small pore size polypropylene membrane filter. Solubles pass into the filtrate reservoir. Additional 50 ml of methanol is used to wash the pellet beaker. The amount of soluble material or washed migrated additive species is obtained after evaporation of the methanol from the filtrate reservoir. Evaporation is carried out at 40° C. in around 70 minutes. Quantity is reported in ppm.

Adding AMSD to this formulation, reference sample C-2, improves scorch with Tsl now 69 minutes and improves cure to 73% hot set elongation. However peroxide migration level is little improved.

Adding 2% of the dielectric fluid SYNESSTIC 5 in the reference composition C-3 improves scorch performance to 62 minutes but cure is negatively affected and hot set elongation increases to 155%. However peroxide migration is greatly reduced to 250 ppm. Combining both addition of dielectric fluid and cure booster AMSD as in inventive samples 1-4, results in an XLPE formulation with good scorch-cure balance and a reduced tendency for peroxide migration.

It is specifically intended that the present invention not be limited to the embodiments and illustrations contained herein, but include modified forms of those embodiments including portions of the embodiments and combinations of elements of different embodiments as come within the scope of the following claims.

I claim:

1. A composition comprising, in weight percent based upon the weight of the composition:
    A. 60 to 97.9 wt % of an ethylene-based polymer;
    B. 1 to 3 wt % of an organic peroxide;
    C. 1 to 2 wt % of an alkylated naphthalene; and
    D. 0.1 to 0.5 wt % of alpha methyl styrene dimer (AMSD).

2. The composition of claim 1, comprising 80 to 97.5 wt % of the ethylene-based polymer.

3. The composition of claim 1, in which the ethylene-based polymer is selected from the group consisting of high density polyethylene (HDPE); medium density polyethylene (MDPE); very low density polyethylene (VLDPE); homogeneously branched, substantially linear ethylene/α-olefin polymers; ethylene block copolymers; and blends thereof.

4. The composition of claim 1, in which the ethylene-based polymer is a blend with low density polyethylene (LDPE).

5. The composition of claim 1, in which the ethylene-based polymer is selected from the group consisting of linear low density polyethylene (LLDPE), high density polyethylene (HDPE), and blends thereof.

6. The composition of claim 1, in which the ethylene-based polymer is a high pressure low density polyethylene (HPLDPE).

7. A composition comprising, in weight percent based upon the weight of the composition:
    A. 80 to 97.9 wt % of low density polyethylene (LDPE);
    B. 1 to 3 wt % of an organic peroxide;
    C. 1 to 2 wt % of an alkylated naphthalene; and
    D. 0.1 to 0.5 wt % of alpha methyl styrene dimer (AMSD).

8. The composition of claim 7, comprising 91.5 to 97.5 wt % of the ethylene-based polymer.

9. The composition of claim 7, in which the organic peroxide is dicumyl peroxide (DCP).

10. The composition of claim 7, further comprising at least one additive.

11. The composition of claim 7, further comprising at least one filler.

12. A crosslinked article made from the composition of claim 7.

13. The article of claim 12, in the form of an insulation layer for a wire or cable.

14. The article of claim 13, in which the cable is a medium or high voltage power cable.

* * * * *